Patented Jan. 14, 1947

2,414,401

UNITED STATES PATENT OFFICE 2,414,401

TERNARY ACRYLIC ESTER, STYRENE, DIENONE INTERPOLYMER

Pliny O. Tawney, Passaic, N. J., assignor to United States Rubber Company, New York, N. Y., a corporation of New Jersey No Drawing. Application September 30, 1943, Serial No. 504,441

3 Claims. (Cl. 260—66)

This invention relates to ternary interpolymers, and more particularly to terpolymers of an acrylic ester, styrene, and a conjugated dienone.

An object of this invention is to provide a new composition comprising ternary interpolymers of an acrylic ester, styrene, and a conjugated dienone. The materials range from thermoplastic, relatively soluble resins, capable of being further polymerized, to relatively insoluble, non-thermoplastic resins. The soluble products are soluble in various organic solvents, including acetone, chloroform, dioxane, and benzene. The expression "an acrylic ester" means an ester either of acrylic acid or of alkacrylic acid. The invention also relates to molding powders, coating compositions, fibres, etc., containing the new terpolymers. Other objects will be apparent from the hereinafter detailed description.

More particularly, the invention relates to the ternary copolymers of styrene, a conjugated dienone, and an ester selected from the class consisting of the alkyl, cycloalkyl, aryl, and aralkyl esters of acrylic acid and methacrylic acid.

Exemplary of the conjugated dienones are the materials having the formula

R—CH=CH—CH=C(R')COR'' where R represents hydrogen, alkyl (methyl, ethyl, propyl, isobutyl, etc.), aryl (e. g., phenyl), or aralkyl (e. g., benzyl); R' represents hydrogen, alkyl (e. g., methyl), aryl (e. g., phenyl), or aralkyl (e. g., benzyl); and R'' represents an alkyl group (e. g., methyl, ethyl, propyl, butyl, isoamyl, hexyl, etc.), aryl (e. g., phenyl), or an aralkyl group (e. g., benzyl).

Exemplary of the acrylic esters are the materials of the type $CH_2=C(R)—COOR'$ where R is hydrogen, alkyl (methyl, ethyl, etc.); R' is an alkyl group (e. g., methyl, ethyl, propyl, isobutyl, hexyl, heptyl, octyl, etc.), a cycloalkyl group such as cyclohexyl, an aryl group (e. g., phenyl), or an aralkyl group (e. g., benzyl).

Mixtures of the acrylic esters may be polymerized with styrene and the conjugated dienone, or mixture of dienones.

The products resulting from this invention possess a combination of desirable properties not obtainable by polymerizing compounds such as methyl methacrylate, and styrene either alone, or together, or by copolymerizing either one with a compound such as 3,5-heptadienone-2. For example, polystyrene is readily attacked by aromatic hydrocarbons such as benzene, and polymethyl methacrylate is soluble in ketones. Each polymer is brittle and lacks toughness. Copolymers of styrene and methyl methacrylate possess better resistance to the attack of hydrocarbon and ketone solvents, but are susceptible to the action of combinations of solvents. Furthermore, copolymers of styrene and methyl methacrylate do not possess residual unsaturation, and consequently, cannot be vulcanized or further polymerized during molding or baking to a substantially insoluble and non-heat-softening state.

My terpolymers, however, can be vulcanized, or can be further polymerized, to a solvent-resistant and heat-resistant state in which they are still hard and tough without being brittle. A further advantage of my terpolymers resides in the fact that products of varying degrees of hardness and softening ranges can be produced by suitably altering the ratios of ingredients. I have found that it is easier to prepare terpolymers when a high initial concentration of methyl methacrylate is not present; also, polymers which contain a high percentage of styrene generally have a lower softening range than those containing high amounts of methacrylic ester. Alternatively, the softening range can be elevated by increasing the content of the dienone in the polymer.

Still another advantage of my terpolymers rests in the observation that they lend themselves more readily to plasticization to produce tough, rubber-like products than do simple polymers or binary copolymers of the ingredients. Evidently, the combination of ester radicals, phenyl radicals, and ketone groups constitutes a polymeric structure which exhibits superior degrees of compatibility with plasticizers, such as dibutyl phthalate, butyl acetyl ricinoleate, and plasticizers known to commerce as Santicizers.

I may use either the emulsion process or the so-called oil-phase process for the polymerization. The monomers have been found to polymerize more uniformly, and at more nearly the same rate, in the emulsified state, so that the emulsion polymerization process is preferred. Various emulsifying agents such as Aerosol OS (isopropyl naphthalene sodium sulphonate), Emulphor O (condensate of ethylene oxide and a higher alcohol), Turkey red oil, etc., may be used.

Considering the three monomers, 3,5-heptadienone-2, styrene, and methyl methacrylate, the unsaturated ketone has been found to polymerize the most slowly; in fact, in an emulsion by itself it undergoes less than 5% polymerization in 24 hours. However, I have found that the presence of an ester such as methyl methacrylate and/or of styrene induces a greater reactivity in the 3,5-heptadienone-2 so that a true interpolymer of the ketone results.

I have found that terpolymers are formed when styrene is present to the extent of from about 20% to about 70% (by weight) of the mixture of monomers. The proportion of dienone such as 3,5-heptadienone-2 in the reaction mixture may be as high as 30% and as low as 10%. The acrylic ester such as methyl methacrylate is used in the proportion of from 30% to 50% of the reaction mixture. It is understood that these proportions may be altered somewhat so as to modify the character of the polymer.

The polymers containing the higher proportions of styrene are more thermoplastic and less resistant to aromatic hydrocarbons than those containing less styrene. The higher proportions of methyl methacrylate lead to polymers which exhibit increasing resistance to petroleum hydrocarbons, and increasing toughness. Increasing the proportion of 3,5-heptadienone-2 gives more brittle and less soluble resins, which are, however, more amenable to cross-linking and vulcanization. Hence, by suitably altering the proportions of reactants, products adaptable to a wide range of requirements may be obtained.

Other acrylic esters which may be used in place of methyl methacrylate are the ethyl, propyl, butyl, amyl, hexyl, cyclohexyl, methylcyclohexyl, phenyl, tolyl, and benzyl esters of acrylic acid and of methacrylic acid.

The products are obtained from the reaction as white milky emulsions which may be used directly for various purposes, such as priming leather, for coatings, as an adhesive, and for impregnation purposes. If so desired, suitable softening agents or fillers may be incorporated with the emulsions before or after polymerization. Upon addition of electrolytes to the emulsions the terpolymers are flocculated and may be recovered by filtering and drying.

The products are true terpolymers as distinguished from mere mechanical mixtures of polymers. It is practically impossible to separate my products into fractions by solution in and precipitation from solvents. If it were a case of mechanical mixtures such as polystyrene and a copolymer of methyl methacrylate and 3,5-heptadienone-2 or poly-methyl methacrylate mixed with a copolymer of styrene and 3,5-heptadienone-2, then these could be separated by preferential solution in appropriate solvents. Such a separation cannot be carried out with my products. Moreover, if a mixture of polymers or copolymers were present, a film, prepared by evaporating a solution of the product on a glass plate, would show opacity, heterogeneity or other such evidence of the existence of two or more components since, in general, polymers and copolymers of the various monomers incorporated in my reaction products are immiscible with each other. The films prepared from my products are clear and homogeneous, hence they must be considered true terpolymers.

Furthermore, my products possess appreciable iodine values, which indicate the presence of unsaturated groups; in this case the unsaturation resides in unreacted olefinic linkages of the 3,5-heptadienone-2. Analyses for carbon and hydrogen on products carefully freed of unreacted starting materials correspond to values predicted for the various terpolymers.

I have found that polymerization in emulsion takes place at ordinary room temperature and that the rate of reaction increases as the temperature rises. I find it advantageous to operate in the range of 50° C. to 70° C., although somewhat higher temperatures may be used.

Polymerization catalysts of the peroxide type may be used in the preparation of my products, examples being inorganic peroxides, such as hydrogen peroxide; persalts, such as percarbonates, perborates, persulfates; and organic peroxides, such as peracetic acid, acetyl peroxide, benzoyl peroxide, benzoyl acetyl peroxide, lauryl peroxide, succinyl peroxide, etc. I have found it expedient, for reasons of solubility, speed of reaction, and economy, to use mixtures of potassium persulfate and hydrogen peroxide as catalysts for the preparation of my new terpolymers.

The following examples, in which the parts are by weight, illustrate the preparation of the new terpolymers, and it will be obvious to those skilled in the art of polymers that the proportions of reactants may be varied within reasonable limits from those actually disclosed. Furthermore, the reaction times, catalysts, and emulsifying agents may be altered without departing from the essence of the invention.

Example 1

A mixture of 60 parts of styrene, 30 parts of methyl methacrylate and 10 parts of 3,5-heptadienone-2 was emulsified by rapid agitation in a mixture of 300 parts of water, 4.5 parts of Aerosol OS (an emulsifying agent, commercially available and manufactured by the American Cyanamid Corporation), 0.5 part of potassium persulphate and 2.0 parts of 30% aqueous hydrogen peroxide.

After the mixture had been heated at 50° C. for 19 hours, with stirring, the polymer was obtained in the form of a stable emulsion which was then coagulated by addition of a warm brine solution. The finely-divided precipitate thus produced was filtered, washed thoroughly with water and dried in vacuo, with heating, to remove unreacted monomers. The amount of dried polymer was 95 parts which is equivalent to 95% of the theoretical yield.

The polymer is readily soluble in acetone, chloroform and glacial acetic acid, and further purification can be effected by dissolving the polymer in acetone and precipitating with a light ligroin fraction, in which the polymer is insoluble.

The dry polymer is a hard, tough, transparent material which softens at 110° C. and decomposes at 180° C. Above the softening temperature the material can be drawn out, or extruded into filaments of considerable strength, and with the application of heat and pressure the polymer can be molded into a variety of shapes.

A sample of the dry polymer was molded at 10,000 p. s. i. and 260° F. to give a tough, transparent body whose surface exhibited considerable mar resistance. On the Rockwell hardness test, the molded article gave a value of 97 on the hard rubber scale.

When the polymer is mixed with plasticizers such as dibutyl phthalate, tricresyl phosphate, ricinoleic acid esters, chlorinated diphenyls, triacetin, etc., tough, elastic, rubber-like products are obtained which can be molded into a variety of shapes with heat and pressure, after the addition of curing agents such as benzoyl peroxide.

*Analysis.*—Found: C, 79.9%; H, 8.1%; iodine number (Wijs), 70. Calculated for a terpolymer containing styrene, methyl methacrylate and 3,5-heptadienone-2 in the ratio of 5 moles:3 moles:1 mole: C, 80.0%; H, 8.02%; iodine number, 27.3.

The iodine number indicates the amount of unsaturation that is potentially available for vulcanization by sulphur or for further polymerization in the presence of catalysts such as peroxides. Since copolymers of styrene and methyl methacrylate give an iodine number of approximately 2.0, it is evident that mine is a true terpolymer, for the residual unsaturation, as indicated by the iodine number, can only be explained by the presence of 3,5-heptadienone-2 in the polymer structure. Only one of the two double bonds in 3,5-heptadienone is required for the interpolymerization with styrene and methyl methacrylate, and hence theoretically, there is an unreacted double bond available for every molecule of the dienone incorporated in the terpolymer.

The fact that the iodine number of the polymer is greater than would be predicted from the theory, is attributed to oxidation of the methyl ketone groups by the Wijs reagent. Since the methyl ketone groups could only have been introduced by the inclusion of 3,5-heptadienone-2 in the polymer, this constitutes further evidence of the existence of a true terpolymer.

*Example 2*

A mixture of 40 parts of styrene, 30 parts of methyl methacrylate and 30 parts of 3,5-heptadienone-2 was emulsified together with catalyst according to the procedure set forth in Example 1. The emulsion was heated at 60° C. with stirring for 20 hours and then the temperature was raised to 70° C. and held there for an additional 19 hours.

The emulsion was coagulated by the addition of sodium chloride, and after being washed thoroughly with water and dried, the polymer was further purified by dissolving it in acetone and precipitating it with a light gasoline fraction. Fifty parts (50% of the theoretical yield) of dry purified product was obtained in the form of a powder which softens at 90° C. and decomposes at 150° C.

The dry polymer is readily soluble in benzene, chloroform, dioxane and acetone. When plasticized with materials such as dibutyl phthalate, triethylene glycol di-2-ethyl butyrate, etc., tough, rubbery products are obtained.

*Example 3*

Example 2 was repeated except that the reaction was carried out at 80° C. for a period of 28 hours. The dry, purified product was obtained in 59% yield.

The material can be plasticized, molded, etc., to yield products similar to those described in previous examples.

*Example 4*

Example 2 was repeated with the following modifications: to the emulsion of the starting materials were added 0.25 part of sodium acetate and 0.20 part of dipotassium hydrogen phosphate to counteract the increasing acidity of the reaction mixture as the methyl methacrylate slowly hydrolyzes. The reaction was carried out at 80° C. for 32 hours and a 66% yield of dry purified polymer was obtained.

*Example 5*

A mixture of 20 parts of styrene, 50 parts of methyl methacrylate and 30 parts of 3,5-heptadienone-2 was emulsified together with catalyst as in Example 1. The reaction was carried out at 60° C. for 20 hours and then at 70° C. for an additional 19 hours. The emulsion was coagulated and a rubbery polymer, plasticized with monomers, was obtained. By dissolving it in acetone and precipitating with a light gasoline fraction the polymer was rid of unreacted starting materials, and after drying in vacuo with heating, a 51% yield of hard, tough material resulted.

The polymer softens at 100° C. and decomposes at 170° C. It is soluble in benzene, chloroform, dioxane and acetone, and can be plasticized by materials such as dibutyl phthalate to give a tough, flexible and transparent product.

*Analysis.*—Found: C, 71.55, 71.71%; H, 8.06, 8.17%. Calculated for a terpolymer containing styrene, methyl methacrylate, and 3,5-heptadienone-2 in the ratio 2 moles:4 moles:1 mole: C, 71.86%; H, 8.14%.

A solution was made by dissolving the polymer in acetone, and adding a small quantity of benzoyl peroxide as a catalyst to promote further polymerization of the dissolved polymer. The solution was applied to metal and to glass as a lacquer. The dried film when baked for one hour at 200° C. polymerized to yield a tough, hard, transparent, infusible film which resisted attack by solvents.

*Example 6*

Example 4 was repeated at a temperature of 80° C. for 28 hrs. Dry, purified polymer was obtained in a 59% yield.

The expression "reacted" refers to the chemical that enters into the make-up of the terpolymer as distinguished from any unreacted starting material that may be present.

Having thus described my invention, what I claim and desire to protect by Letters Patent is:

1. Terpolymers of an ester of an alpha-unsaturated acrylic acid of the formula

$$CH_2=C(R)-COOR'$$

where R is a radical selected from the group consisting of hydrogen, methyl, and ethyl, and R' is a radical selected from the group consisting of alkyl, cycloalkyl, aryl, and aralkyl groups, styrene, and a conjugated dienone containing two conjugated olefinic linkages in an open chain, the proportions, by weight, of the respective monomers in the polymerizable mix being from about 30 to about 50% of the acrylic ester, about 20 to about 70% of styrene, and from about 10 to about 30% of the dienone, the products being further characterized as being soluble in acetone, and by containing residual unsaturation and being capable of vulcanization and of further polymerization.

2. Terpolymers of methyl methacrylate, styrene, and 3,5-heptadienone-2, the proportions by weight of the respective monomers in the polymerizable mix being from about 30 to about 50% of the methacrylate, about 20 to about 70% of styrene, and from about 10 to about 30% of the dienone, the products being further characterized as being soluble in acetone, and by containing residual unsaturation and being capable of vulcanization and of further polymerization.

3. A process which comprises interpolymerizing an ester of an alpha-unsaturated acrylic acid of the formula $CH_2=C(R)-COOR'$ where R is a radical selected from the group consisting of hydrogen, methyl, and ethyl, and R' is a radical selected from the group consisting of alkyl, cycloalkyl, aryl, and aralkyl groups, styrene, and a conjugated dienone containing two conjugated olefinic linkages in an open chain, the proportions, by weight, of the respective monomers in the polymerizable mix being from about 30 to about 50% of the acrylic ester, about 20 to about 70% of styrene, and from about 10 to about 30% of the dienone, to an extent to produce a product characterized as being soluble in acetone, and by containing residual unsaturation and being capable of vulcanization and of further polymerization.

PLINY O. TAWNEY.